Figure 5:
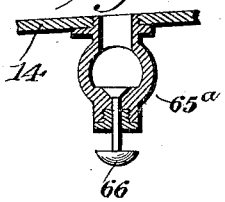

No. 638,919. Patented Dec. 12, 1899.
R. K. GIFFEN.
APPARATUS FOR MAKING FERTILIZERS.
(Application filed Dec. 8, 1898.)
(No Model.) 3 Sheets—Sheet 1.
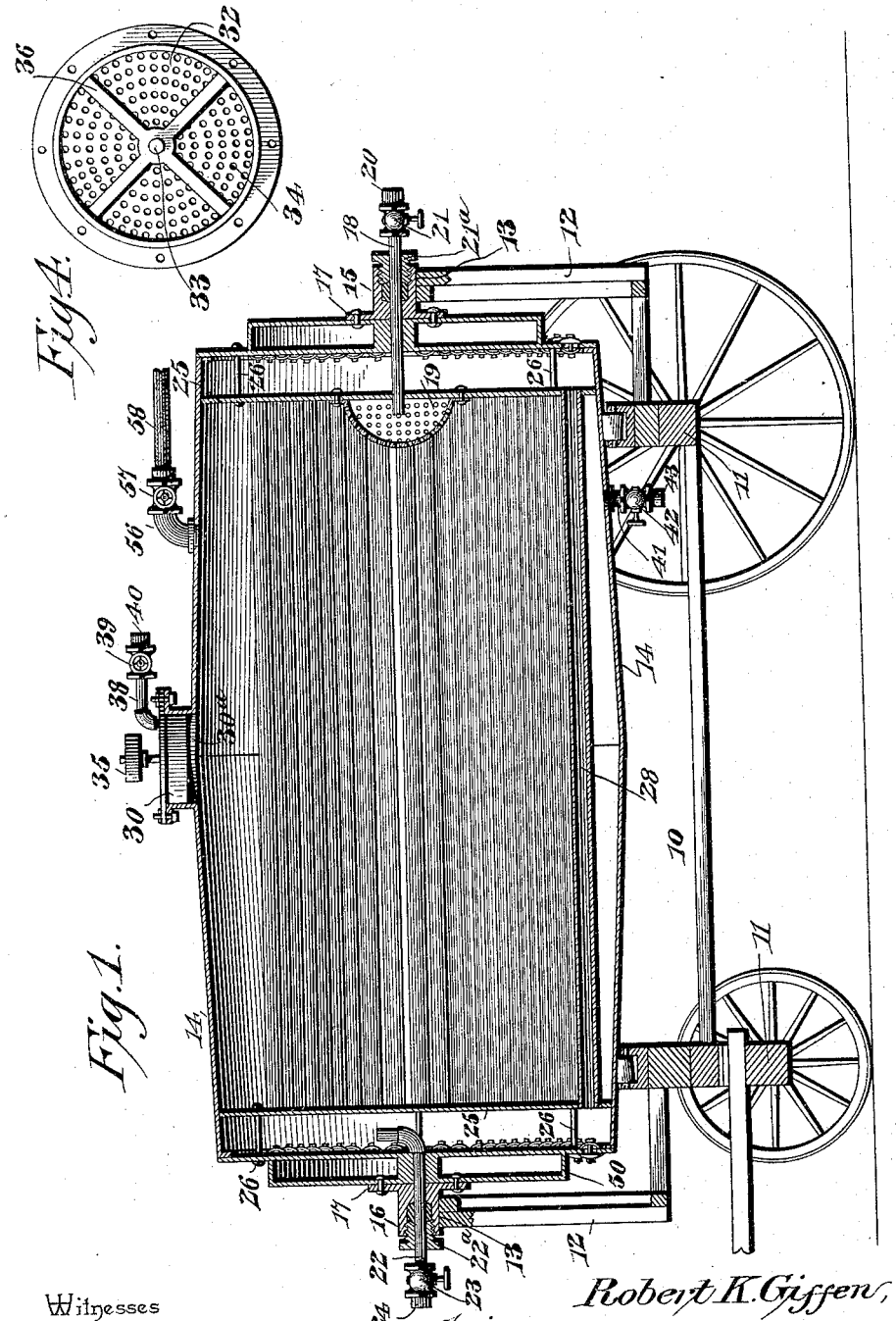
Witnesses
Jas. K. McCuthran
H. F. Bernhard
Robert K. Giffen, Inventor
By his Attorneys.
C. A. Snow & Co.

No. 638,919. Patented Dec. 12, 1899.
R. K. GIFFEN.
APPARATUS FOR MAKING FERTILIZERS.
(Application filed Dec. 8, 1898.)
(No Model.) 3 Sheets—Sheet 2.
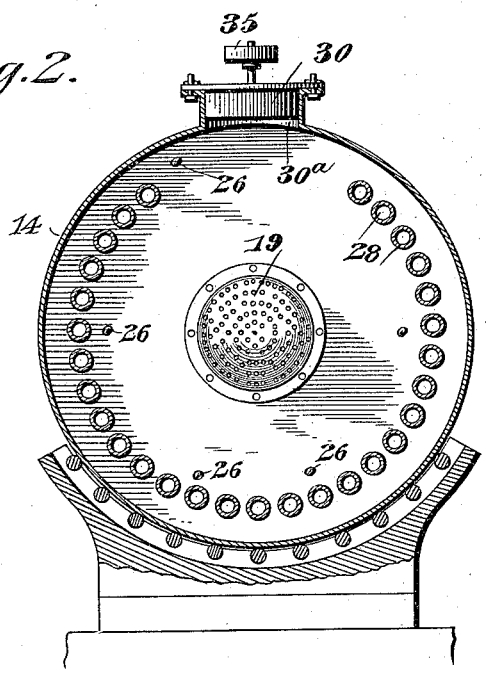
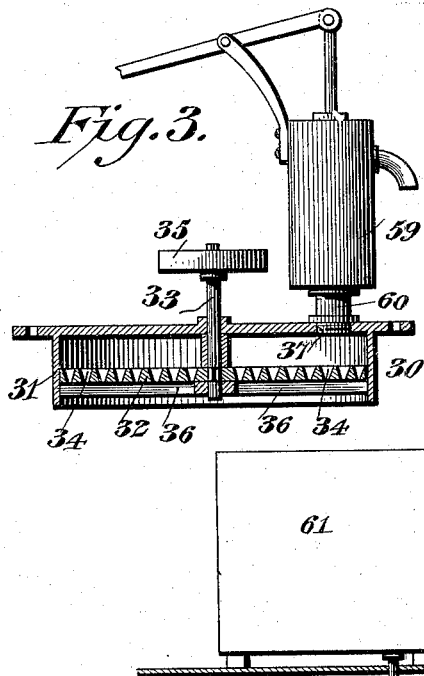
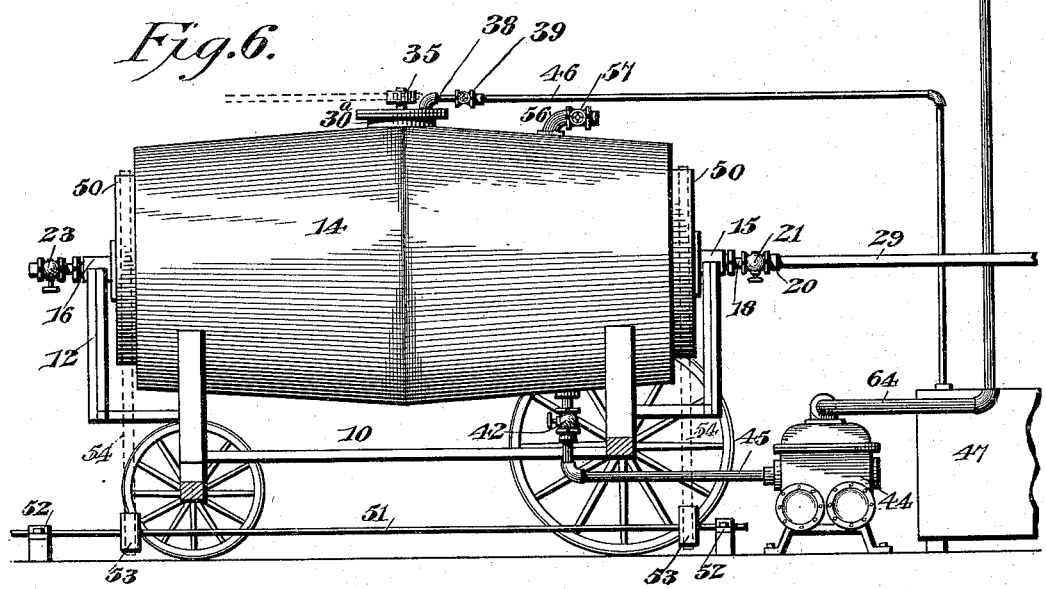
Witnesses
Jas. K. McCathran
H. F. Beucher
Robert K. Giffen, Inventor
By his Attorneys,
C. A. Snow & Co.

No. 638,919. Patented Dec. 12, 1899.
R. K. GIFFEN.
APPARATUS FOR MAKING FERTILIZERS.
(Application filed Dec. 8, 1898.)

(No Model.) 3 Sheets—Sheet 3.

Witnesses Robert K. Giffen, Inventor
By his Attorneys,

UNITED STATES PATENT OFFICE.

ROBERT K. GIFFEN, OF WHEELING, WEST VIRGINIA, ASSIGNOR TO THE UNITED STATES FERTILIZER COMPANY, OF SAME PLACE.

APPARATUS FOR MAKING FERTILIZERS.

SPECIFICATION forming part of Letters Patent No. 638,919, dated December 12, 1899.

Application filed December 8, 1898. Serial No. 698,632. (No model.)

*To all whom it may concern:*

Be it known that I, ROBERT K. GIFFEN, a citizen of the United States, residing at Wheeling, in the county of Ohio and State of West Virginia, have invented a new and useful Apparatus for Obtaining Fertilizers from Waste Materials, of which the following is a specification.

My invention relates to an apparatus for treating garbage, butchers' offal, night-soil, dead animals, and other refuse from cities; and the object in view is to effect the treatment in an economical, sanitary, and expeditious manner.

One purpose of the present invention is to extract from the substance under treatment the grease and oils which are valuable in the manufacture of soap and in other arts and to treat the residue or solid matter in order to extract all liquid matter therefrom and obtain as a product ammoniated fertilizer, which under certain steps of treatment continued in the apparatus is converted into commercial fertilizer.

Another purpose of the invention is to provide a portable tank adapted to serve as a convenient means for the collection of the waste or refuse substances and also as the receptacle in which such substances are treated for the extraction of the greasy and oleaginous matters and the conversion of the solid residue into commercial fertilizer, thus obviating the transfer of the residue either after its collection or in the course of its treatment, whereby the refuse may be handled under sanitary conditions and without exposing the refuse to the air.

The invention consists of a refuse-treating apparatus comprising in its preferred embodiment a portable truck, a treatment vessel or tank revolubly mounted on the truck and having means for admitting steam to the contents thereof, pumping means for forcing a brine solution into the tank, means for positively rotating the tank on its axis, and means to secure the circulation of a heating medium within the tank without coming in direct contact with the mass therein.

The invention further consists in the combination, with a tank or treatment vessel, of means for mechanically separating the greasy matters from the particles of comminuted pulpy mass, said means comprising a rotary screen across the outlet or manhole of the tank and a cleaner device contiguous to the face of the screen to keep the latter in a cleaned condition and obviate clogging of the screen.

With these ends in view my invention consists in the novel combination of elements and in the construction and arrangement of parts, which will be hereinafter fully described and claimed.

To enable others to understand the invention, I have illustrated the preferred embodiment thereof in the accompanying drawings, forming a part of this specification, and in which—

Figure 8:
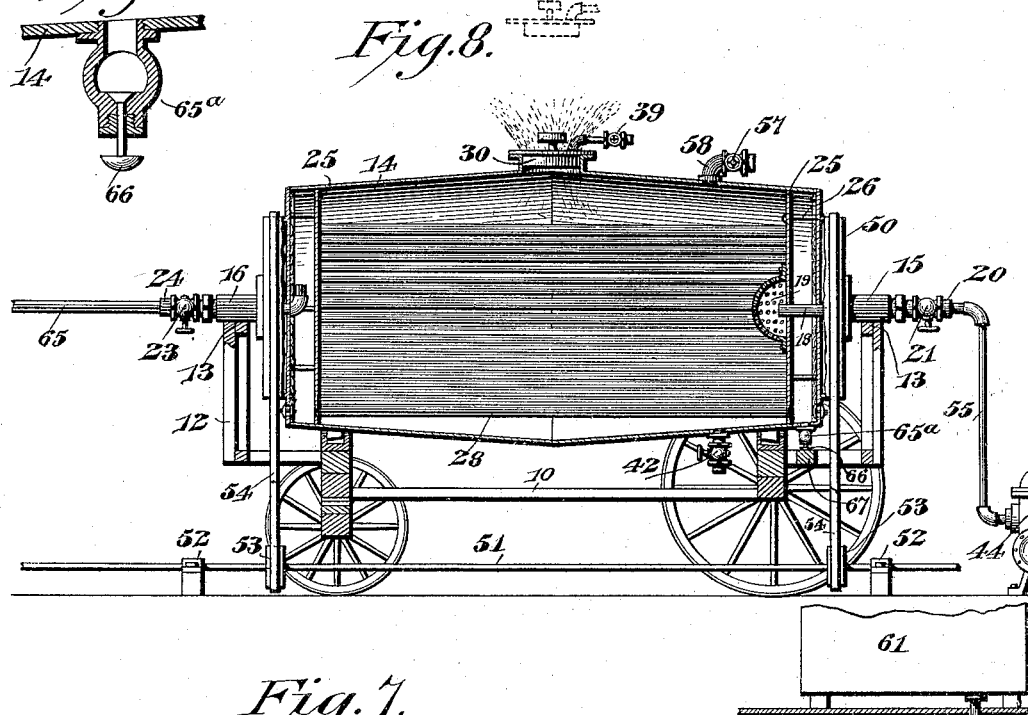
Figure 7:
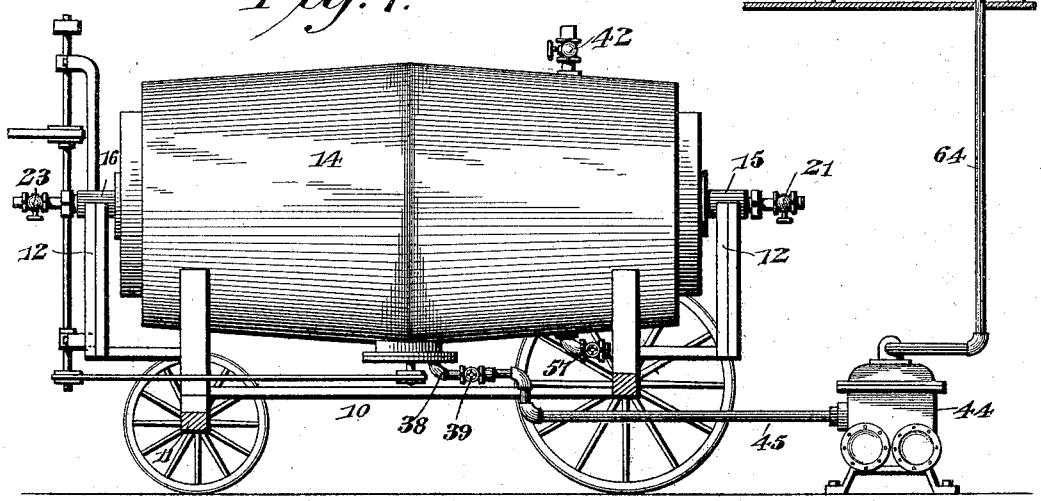

Figure 1 is a sectional elevation of a portable tank constructed in accordance with my invention and adapted for the collection of garbage or other refuse. Fig. 2 is a vertical transverse section on the plane indicated by the dotted line 2 2 of Fig. 1. Fig. 3 is an enlarged detail sectional view through the rotary separator which serves to detain the comminuted particles of the pulpy mass when withdrawing the greasy and oleaginous matters from such mass or in extracting the brine and liquid matters from the solid residue. Fig. 4 is a bottom plan view of the manhole-cover which carries the rotary separator and the cleaner by which the separator is kept in an operative condition free from accumulations of the pulpy mass. Fig. 5 is an enlarged detail view of the automatic drain-valve by which the water of condensation may be discharged from the tank during the operation of drying the substance therein. Fig. 6 is a sectional elevation of the tank connected operatively with appliances for treating the substance or contents of the tank. Fig. 7 is a sectional elevation with the tank in its reversed position to Fig. 6 and showing the apparatus connected with the pump for exhausting the liquid matter and brine solution from the tank, so as to create a vacuum in said tank for the more efficient expression of the liquid matter from the solid residue. Fig. 8 is a sectional elevation with the tank in its upright and normal position, illustrating the step of supplying certain fertilizer elements to the solid residue forming the ammoniated fertilizer within the tank and showing the adaptation of the tank as the means for drying and mixing the fertilizer elements.

Like numerals of reference denote like and corresponding parts in each of the several figures of the drawings.

In carrying my invention into practice I prefer to employ a portable tank, which is carried by a wheeled truck and is adapted to serve the purposes of a collecting vessel, which may be moved from place to place or from one locality to another to receive the waste materials or refuse which is to be treated according to my invention for the purpose of extracting the greasy and oily matters from such waste material and to obtain a solid residue in the form of ammoniated fertilizer, which may be converted into commercial fertilizer by admixture therewith of certain other fertilizing agents. The portable collecting-tank of my invention is mounted on a wheeled truck for rotation on its axis, so as to effect the reduction of the contents thereof to a pulpy condition or mass, and said tank or vessel is provided with means whereby superheated steam may be supplied to the contents of such vessel for the purpose of cooking the mass therein and also for the purpose of drying the mass while it is in an agitated condition. In short, the several steps to which the refuse is subjected when it is treated in accordance with my invention may all be effected in the single tank or vessel, which is mounted on the portable truck, whereby the tank is adapted for the collection and treatment of the refuse substances in an economical, sanitary, and expeditious manner and without involving the transfer of such refuse or waste from the collecting vessel to treatment vessels.

While I prefer to carry out the method of treating the refuse or waste material in a single portable structure, I would have it understood that I do not strictly confine the practicing of my process to an apparatus in which the refuse is collected and treated in one and the same vessel, because it will be evident that some of the advantages of my invention, particularly in relation to the process of treating the waste material, may be effected in a stationary plant or apparatus, to which the refuse may be transported after collection thereof by a suitable vehicle. For the reasons indicated, however, and largely on sanitary grounds, I prefer to collect and treat the refuse in a single portable structure, constituting the preferred embodiment of my invention, which is represented by the accompanying drawings.

10 designates a suitable truck or frame of any approved construction, and this truck is mounted on wheeled axles 11. The truck-frame is equipped with pillow-blocks or standards 12, which are furnished with proper journal-bearings 13, adapted to receive a collecting-tank and treatment vessel 14. This tank or vessel 14 is cylindrical in form and of sheet-metal construction, and said vessel is revolubly mounted on the portable truck by the axial journals or trunnions 15 16, each of which is hollow or tubular to provide for the admission of steam as a heating medium to the interior chamber of said drum. Each journal has a face-plate 17, by which it is secured firmly to one of the heads of the drum-shaped tank or vessel, and the two journals are in axial alinement with each other and with the revoluble tank, so as to fit properly in the bearings 13 of the pillow-blocks or standards, whereby the cylindrical tank is adapted to rotate on the truck as required by certain steps in the treatment of the refuse or waste by my process. The steam necessary to cook the contents of the tank is supplied to the interior chamber by means of a superheated-steam pipe 18, which is carried or arranged axially within the hollow journal 15 at one end of the tank, and this short section of steam-pipe 18 extends through one of the drum-heads and a partition adjacent thereto, so as to have its delivery end terminate in the interior chamber of the tank. This delivery end of the short section of pipe 18 is provided with a screen 19, arranged over the mouth or orifice of the pipe, and said screen permits the free passage of the steam, while excluding particles of a pulpy mass contained within the tank from passing into or through the steam-pipe, said screen being particularly serviceable when the supply of steam is cut off and brine is pumped into the tank. This short steam-pipe is extended beyond the outer end of the journal 15. Its protruding end is provided with a coupling 20 of any suitable character for the purpose of uniting said pipe 18 with a steam-supply pipe or with a pipe leading to a vacuum-pump, and the pipe 18 is provided with a suitable cock or valve 21, by which it may be closed. Said pipe 18 is made steam-tight with the hollow journal 15 by a suitable stuffing-box 21$^a$. The other hollow journal 16 at the opposite end of the revoluble tank is equipped with a steam-pipe 22, which is secured steam-tight in the journal 16 by a suitable stuffing-box 22$^a$. The inner end of this pipe 22 discharges into a heating-chamber at the end of the tank, which is equipped with a journal 16, as will presently appear, and said steam-pipe 22 is provided with a cock or valve 23 and at its exposed protruding end with a coupling 24 for the purpose of uniting the pipe 22 with a steam-supply pipe, by which superheated steam may be fed to the circulating chambers and tubes of the revoluble tank. Although I have mentioned that this revoluble tank is of cylindrical form, I prefer to taper the shell from the ends toward the middle thereof, thus giving to the shell a double-conical appearance, by which the contents of the tank are caused to drain or gravitate toward a centrally-disposed manhole, and thereby effect the rapid discharge of the pulpy mass or the residue from the tank after the treatment is completed.

Within the tank, near the ends thereof and parallel to the heads which close the ends of the tank, are provided the partitions 25, which are secured to the shell and are united with the heads by stay-bolts 26. These heads and partitions of the tank provide the circulating-chambers 27, into one of which steam is discharged from the inlet-pipe 22, and these partitions are joined together by the annular series of circulating-pipes 28, which are arranged longitudinally of the tank to extend through the refuse-chamber thereof, the ends of said pipes being suitably secured by steam-pipe joints with the partitions 25. These partitions serve to materially reinforce the shell of the revoluble tank, thus contributing to the strength and stability of the structure, and the circulating-chambers 27 and the longitudinal circulating-flues 28 provide the means for the circulation of superheating steam for the purpose of heating the interior chamber of the revoluble tank, so as to facilitate the drying of the ammoniated fertilizer, which is the product remaining in the tank after the grease has been eliminated from the pulpy mass of residue and the brine and liquid matters have been expressed therefrom.

For the purpose of cooking the waste material or refuse which is contained in the tank 14 a steam-pipe 29 is provided at the plant or place to which the portable tank is conveyed for treating the contents thereof. This pipe 29 (shown by Fig. 6) is adapted to be supplied with superheated steam, and as one means for heating the steam to the required temperature I may mention that the battery of boilers which is provided for the generation of the steam may be equipped within the fire-box thereof with a coil, through which the steam from the boilers is conducted previous to supplying the same by the pipe 29 to the pipe 18, forming a part of the portable tank.

To conveniently dump the refuse or waste materials into the tank, I provide a central manhole 30ª, which is normally closed tightly by the manhole-cover 30, adapted to be secured detachably and firmly to the tank by any suitable or preferred means. This manhole-cover has a circumferential flange 31, forming a chamber or receptacle, which accommodates a rotary separator-screen 32. This separator-screen consists of a plate or disk of sheet metal provided with a plurality of tapered or flared holes 34, and said disk is attached rigidly to a revoluble shaft 33. Said shaft is journaled in a suitable bearing provided centrally on the manhole-cover and in a bearing at the center of a stationary clearer-frame, presently described, and the protruding end of the shaft is equipped with a small driving-pulley 35, around which is fitted a suitable belt (indicated by dotted lines in Fig. 6) for the purpose of rotating the shaft and the separator-screen carried thereby. The clearer-frame 36 is secured firmly within the flanged manhole-cover, and it is constructed with a central bearing to accommodate the inner end of the screen-shaft 33. The said clearer-frame is of skeleton construction to provide for the free passage of the grease, the brine solution, and the liquid matters to and through the screen, and the inner face of this screen lies contiguous to the clearer-frame, so as to sweep close thereto, whereby the clearer-frame prevents clogging of the openings in the rotary screen by sweeping therefrom the particles of comminuted pulp when the screen is in action.

The manhole-cover 30 is provided with a threaded opening or socket 37, into which is detachably screwed a short off-bearing pipe 38. This pipe is provided with a stop-cock or valve 39, and its free end has a coupling 40 of any suitable construction, whereby said pipe 38 may be united to a pipe provided at the plant or station for conducting the grease and oily matters to a suitable storage-tank presently referred to.

The revoluble tank is provided in its side opposite the manhole 30ª with a brine-inlet pipe 41, which is suitably secured thereto at a point between the circulating-chambers 27 and is designed to communicate with the large treatment-chamber of said tank. This brine-inlet pipe has a stop-cock or valve 42 and a coupling 43. To supply the brine to the tank 14, I provide a pump 44, which is adapted to serve not only as the means for feeding the brine to the tank 14, but as the means for extracting the brine and liquid matters from the pulpy mass and for creating a vacuum in the tank 14 and also for exhausting the foul odors which arise from the pulpy mass during the operation of drying the residue and of mixing fertilizing ingredients therewith to produce a commercial fertilizer. The pump 44 has a feed-pipe 45, which is united by the coupling 43 to the brine-inlet pipe 41, whereby the pump may be operatively connected to the revoluble tank 14.

A grease-pipe 46 is provided at the plant or station in an elevated position proper for connection with the off-bearing pipe 38 through the medium of the coupling 40 when the portable tank is drawn to the station in a position adjacent to the pump and the grease-pipe 46, the latter being carried to a suitable tank 47, provided for the storage of the grease extracted from the refuse of waste material in the tank. This grease has commercial value in that it may be used in the manufacture of soap or in other arts.

The revoluble tank mounted on the portable truck may be rotated on its axis while at the plant or station by any suitable means, and as one adaptation of the means for driving the tank I have shown the latter as equipped with driving-pulleys 50, located, preferably, at the opposite ends of said tank. A horizontal shaft 51 is disposed longitudinally on the truck-frame below the revoluble tank 14, and this shaft is journaled in bearings 52 on the truck-frame. The shaft 51 is equipped with pulleys 53, which are in the vertical planes of the pulleys 50 on the tank, and these pulleys 50 53 are connected by the endless belts 54. Although I have described pulleys and belts as the gearing for connecting the driving-shaft to the tank, it is evident that spur-gearing or sprocket-gearing may be substituted therefor, and it is also evident that the shaft for driving the tank may be supported in suitable bearings at the plant or station for operative connection with the tank when the latter is drawn to the station for the treatment of the materials therein.

In the course of treatment of the contents of the tank it becomes necessary to dry the ammoniated fertilizer remaining as a solid product in the tank after the separation of the grease and the extraction of the brine solution and liquid matters from the pulpy mass, and to expeditiously dry this solid residue I propose to rotate the tank on its axis in order to agitate the contents thereof and at the same time create a suction from the tank through the pump in order to carry off the foul odors which arise from the residue contained within the tank. This exhaustion of the foul odors may be effected conveniently by a pipe 55, which is adapted to be coupled at 19 with the short pipe 18 and also with the pump 44.

In the operation of collecting the garbage or other waste materials from a city the manhole-cover may be removed at intervals to permit the material to be dumped into the tank; but certain kinds of material may be drawn by suction into the tank from a vault or other receptacle. In collecting materials from a vault it is my purpose to create a partial vacuum in the tank 14 before it leaves the plant or station, and this may readily be effected by operating the pump 44 in a manner to exhaust the air therefrom. The tank is tightly closed or sealed to maintain this vacuum, and it is equipped with a suction-pipe 56, having a suitable valve or cock 57. This suction-pipe may be attached to a flexible pipe or hose 58, adapted for introduction into or connection with a vault or receptacle, and when the valve 56 is opened to establish communication between the suction-pipe and the vacuum-chamber of the portable tank a suction is created through the pipe 56 58 for the conveyance of the material from the vault into the tank 14 in a sanitary manner.

The operation of my apparatus may be described as follows: All the valves of the tank are closed tightly and the portable apparatus may be drawn around the streets of a city or to a place where the refuse or offal is located. The tank 14 may receive the refuse either through the manhole 30 or by the suction-pipe. Under some circumstances the vacuum in the portable tank when used for exhausting the contents of vaults may become partially destroyed, and to restore this vacuum to working condition I may equip the portable tank with a hand vacuum-pump 59, having a threaded nozzle 60, adapted to be screwed to the threaded opening 37 in the manhole-cover, whereby the pump-lever may be operated to exhaust air and gases from the portable tank 14. After the tank has become charged or filled with refuse or waste materials it is drawn to the plant or station for the treatment of the substance therein. The first step involved in this treatment is to cook the materials, and this is effected at the station by coupling the superheated steam-pipe 29 at 20 to the short pipe 18, which discharges through the screen 19 into the large chamber of the tank. The steam is admitted by the pipes 18 21 until the steam-pressure in the portable tank is equal to the steam-pressure in the battery of boilers, and the communication between the tank and the boilers is kept open during the revolution of the tank and while the cooking step of the process is being effected. The driving mechanism, consisting of the shaft 51 and the gearing connecting the latter with the tank, is now set in motion by any suitable connection with a source of power at the station, and the tank 14 is thus rotated on its axis, whereby the contents of the tank are agitated and cooked until the mass is reduced to a comminuted pulpy condition. The driving mechanism is then arrested and the tank is brought to a state of rest, in which condition it is allowed to remain for a period of twenty or thirty minutes in order to permit the solid portion of the pulpy mass to settle to the bottom of the tank. The next step in the treatment of the waste material consists in forcing a strong or concentrated solution of brine into the tank for the purpose of floating the grease and oil and of effecting the thorough separation of the grease from the liquid matters and the solid particles of pulp contained in the comminuted cooked mass. I prefer to employ this strong or concentrated solution of brine because its high specific gravity has a tendency to thoroughly separate the grease and oil from the liquid matters, and it obviates commingling of the grease with the solution which is forced into the pulpy mass, and this brine solution also increases the value of the solid residue because of the absorption by the residue of the saline properties from the brine solution. When the pump is to be connected with the tank 14, the latter is turned to the position indicated by Fig. 6 for the manhole-cover 30 to lie on the upper side of the tank, and the pipe 45 is united by the coupling 43 to the brine-pipe 41. The pump is also connected by a pipe 64 with a tank 61, from which the brine may be drawn, and when the pump is set in operation the brine is forced through the pipes 45 and 41 into the tank until the latter is filled. The shaft 33 of the revoluble screen 32 is driven by a suitable belt, and the valve 39 in the pipe 38 is open to permit the grease and oil to pass through the pipe 46 into the grease-tank 47. By rotating the screen 32 it is caused to sweep close to the clearer 36, and this screen permits the grease and oil to pass freely from the tank 14 to the pipe 46, and thence to the tank 47; but it prevents the solid particles of refuse from passing into the pipe 46. The rotation of the screen adjacent to the clearer 36 obviates clogging of the openings in the screen-plate, and the latter is thus kept in a clean condition and free from clogging by solid particles of refuse. The next step in the treatment of the refuse consists in drawing off the brine and liquid matters from the pulpy mass in the tank 14, and to effect this operation the valve 39 in the pipe 38 is closed, the grease-pipe 46 is uncoupled from the pipe 38, and the tank is partially turned on its axis to bring it into the position shown by Fig. 7. In this position of the tank the pipe 45 is united by the coupling 40 to the pipe 38, and the pump is thus operatively connected with the manhole-cover of the revoluble tank 14. The screen 32 is now rotated and the valve 39 is open to establish communication through the pipe 45 and the pipe 38 between the tank and the pump, the latter being operatively connected by the pipe 64 with the elevated brine-tank 61. The pump is now operated to draw the brine and liquid matters from the revoluble tank and force the same into the elevated brine-tank 61, in which the brine is stored until it is desired to use the brine again in the treatment of another charge of material. The operation of pumping is continued after the brine and liquid matters have been drawn off from the solid residue and until the air has been exhausted from the tank, so as to attain a vacuum in the tank, the pressure of which is about forty pounds to the square inch, which operates efficiently to express the liquid matters from the solid residue, thus leaving the latter in a condition free from liquid and suitable for the final step of drying the residue. The brine-pump is now disconnected from the revoluble tank, and the latter is turned by the driving mechanism to its normal upright position, as represented by Fig. 8. While in this condition the manhole-cover is removed and fertilizing agents, such as acid phosphates and potash, are deposited in the tank for admixture with the residue, which is in the form of ammoniated fertilizer, the admixture of the acid phosphates and potash with the ammoniated fertilizer producing a good quality of commercial fertilizer. The manhole-cover is now applied, the pipe 55 is coupled with the pump and the pipe 18, and the pipe 22 is connected with a superheated steam-pipe 65 in order to supply steam to the chambers 27 and flues 28 of the tank, thereby heating the latter and the solid residue contained therein. The driving mechanism and the pump 44 are now set in operation for the purpose of rotating the tank 14 on its axis and of exhausting the foul odors from the tank, and these odors may be forced by the pump into the combustion-chamber of a furnace or discharged into a sewer or other place. The rotation of the tank insures the intimate admixture of the fertilizing agents, which are introduced into the tank with the residue in the form of ammoniated fertilizer. The agitation of the contents of the tank not only secures the admixture of the ingredients, but they are better exposed to the action of the heat, and as the pump exhausts the foul odors and a portion of the heat a circulation is secured through the tank, which tends to facilitate the operation of drying the residue. The pump and superheated steam-pipe are now disconnected and the revoluble tank is inverted, so that the cover 30 may be removed for the purpose of dumping the fertilizer into an elevator-pit, by which it may be carried to a screen, after which the stock fertilizer may be stored in a warehouse or packed in sacks for shipment or storage.

Changes may be made in the form of some of the parts while their essential features are retained and the spirit of the invention embodied. Hence I do not desire to be limited to the precise form of all the parts as shown, reserving the right to vary therefrom.

In the process of drying the ammoniated fertilizer steam circulating through the chambers and flues causes the accumulation of water of condensation, and it is necessary to discharge this water of condensation from the tank 14 while it is revolving. To attain this end, I provide at or near one end of the revoluble tank an automatic drip-cock $65^a$, having an exposed head 66, arranged in the path of a wiper 67. As the tank revolves, the wiper impinges against the valve-head to momentarily open the drip-cock for the escape of the water of condensation from the chambers of the tank; but as the head clears the wiper the cock is closed automatically by the pressure in the tank.

Although my apparatus is especially designed for the purpose of treating refuse, as herein described, I reserve the right to use the apparatus for treating other substances, such as for washing and drying rags and wool. The substance—rags or wool—may be deposited in the tank along with a suitable agent to saponify the liquid, steam is supplied to the tank, and water is forced into the mass, after which the tank is rotated to agitate and boil the substance. The tank may now be arrested, the water pumped therefrom until the vacuum-pressure is established in the tank to express the liquid from the mass, and steam then caused to circulate through the tank, which at the same time is rotated, to thoroughly dry the rags or wool.

What I claim is—

1. An apparatus for treating refuse materials comprising a revoluble tank provided with hollow trunnions and with spaced partitions which are fixed within the tank-shell contiguous to the heads thereof and forming the steam-chambers on opposite sides of the refuse-treating chamber, the circulating-pipes fixed to said partitions to extend longitudinally through the refuse-treating chamber and having their ends communicating with oppositely-located steam-chambers, a valved pump-nipple fixed to said tank and communicating with the refuse-treating chamber, a manhole-cover secured to the tank and having a valved pipe-nipple, and valved pipes extending through the hollow trunnions of the revoluble tank, one of said pipes communicating with a steam-chamber and the other pipe communicating with the refuse-treating chamber, substantially as described.

2. An apparatus for treating refuse materials comprising a revoluble treatment-tank provided with an internal heat-circulating appliance, a manhole-cover fastened to said tank and having an outlet-pipe, a revoluble screen over the orifice or mouth of said outlet-pipe, and a pump-nipple attached to the tank on the opposite side from the manhole-cover, whereby a separating solution may be forced into one side of the treatment-tank and oily or greasy matters discharged from said tank through said screen and outlet-pipe, substantially as described.

3. A portable apparatus for the collection and treatment of refuse materials, comprising a wheeled truck, a revoluble tank mounted on said truck and embracing a heating appliance, a brine-admission pipe connected with the tank, a manhole-cover clamped to the tank and provided with a screen, and a grease-pipe connected with said manhole-cover, substantially as described.

4. In an apparatus for the treatment of refuse material, the combination of a tank, means for forcing a brine solution therein, an off-bearing grease-pipe connected with the tank, a screen across the receiving end of the grease-pipe, and a clearer contiguous to the screen, said clearer and screen being movable relatively one to the other, substantially as described.

5. In an apparatus for the treatment of refuse materials, the combination of a tank having means for admitting a separating solution thereto, an off-bearing grease-pipe connected with said tank, a revoluble screen across the receiving end of said pipe, and a stationary clearer contiguous to one face of the screen, substantially as described.

6. In an apparatus for the treatment of refuse materials, the combination of a tank having means for admitting a separating solution thereto, an off-bearing grease-pipe, a screen device between the tank-chamber and the inlet to said pipe, and means for maintaining the face of the screen in a condition free from accumulations of pulpy residue, substantially as described.

7. In a portable apparatus for the collection and treatment of refuse materials, a tank provided with a manhole, a cover for said manhole having an off-bearing grease-pipe attached thereto, a revoluble screen mounted in the manhole-cover, and a clearer attached to the manhole-cover contiguous to the screen, substantially as described.

8. In an apparatus for the treatment of refuse materials, the combination of a tank supported axially for revoluble adjustment, a pipe connection attached to said tank, a screen across the end of said pipe connections, and a clearer device contiguous to said screen, one of said parts being movable relatively to the other, whereby the tank may be adjusted on its axis and inverted for different pipes to be coupled to the pipe connection, substantially as described.

9. In an apparatus for the treatment of refuse materials, the combination of a tank, a brine-pump connected thereto, an off-bearing grease-pipe, a screen across the inlet to said grease-pipe, a clearer contiguous to the screen, and means for moving the screen relative to the clearer, substantially as described.

10. In an apparatus for treating refuse materials, the combination of a revoluble tank provided with a hollow journal and with a manhole-cover for introducing fertilizing agents to the treatment-chamber of said tank, means for heating the tank located therein, an exhausting-pump connected operatively through one hollow trunnion with the treatment-chamber of the tank for exhausting odors therefrom during the period of rotation of the treatment-tank, and a steam-pipe connected through the other journal to the heating appliance, whereby the treatment-chamber may be exhausted and the steam supplied to the heater while the tank is in motion, substantially as described.

11. An apparatus for treating refuse materials consisting of a revoluble tank, means for heating located therein, and a manhole-cover, a pump detachably connected with said cover, an off-bearing pipe also connected detachably to the tank, axially-disposed pipes at opposite ends of the tank, and arranged for one pipe to communicate with the treatment-chamber of the tank, and the other pipe to supply superheated steam to the heating appliance of said tank, and means whereby said pump may be connected with the pipe which communicates with the treatment-chamber, substantially as described.

In testimony that I claim the foregoing as my own I have hereto affixed my signature in the presence of two witnesses.

ROBERT K. GIFFEN.

Witnesses:
JOHN H. SIGGERS,
FRANCES PEYTON SMITH.